US010410366B2

United States Patent
Michielin et al.

(10) Patent No.: US 10,410,366 B2
(45) Date of Patent: Sep. 10, 2019

(54) IMAGING SYSTEM USING STRUCTURED LIGHT FOR DEPTH RECOVERY

(71) Applicant: Sony Corporation, Tokyo (JP)

(72) Inventors: Francesco Michielin, Stuttgart (DE); Paul Springer, Stuttgart (DE); Thimo Emmerich, Stuttgart (DE); Zoltan Facius, Stuttgart (DE); Piergiorgio Sartor, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 15/560,782

(22) PCT Filed: Mar. 23, 2016

(86) PCT No.: PCT/EP2016/056378
§ 371 (c)(1),
(2) Date: Sep. 22, 2017

(87) PCT Pub. No.: WO2016/156149
PCT Pub. Date: Oct. 6, 2016

(65) Prior Publication Data
US 2018/0075612 A1    Mar. 15, 2018

(30) Foreign Application Priority Data
Mar. 31, 2015 (EP) .................................... 15000935

(51) Int. Cl.
*G06T 7/521* (2017.01)
*G06T 5/00* (2006.01)
(Continued)

(52) U.S. Cl.
CPC .......... *G06T 7/521* (2017.01); *G02B 23/2461* (2013.01); *G06T 5/003* (2013.01);
(Continued)

(58) Field of Classification Search
USPC ........................................................ 348/68
See application file for complete search history.

(56) References Cited

U.S. PATENT DOCUMENTS 8,369,579 B2   2/2013 Frigerio
2009/0273792 A1*  11/2009 Hullin ................ G01B 11/2504
                                                      356/601
(Continued)

FOREIGN PATENT DOCUMENTS

CA        2 763 426 C       8/2017
DE    10 2009 025 815 A1    1/2010

OTHER PUBLICATIONS

Office Action dated Mar. 21, 2018 in corresponding German Patent Application No. 11 2016 001 559.3, 6 pages.
(Continued)

*Primary Examiner* — Behrooz M Senfi
(74) *Attorney, Agent, or Firm* — Xsensus LLP

(57) ABSTRACT

An imaging system includes an optical unit that captures, from a scene, sets of first images as well as sets of second images. The scene is illuminated with non-structured light when the sets of first images are captured and illuminated with structured light when the sets of second images are captured. A pattern processing unit generates, from the second images, a recovered shadow pattern from a shadow pattern projected onto the scene during illumination with structured light, wherein at least one motion-compensated reference image is used. A depth processing unit obtains depth information on the basis of the recovered shadow pattern.

16 Claims, 12 Drawing Sheets

(51) Int. Cl.
   *G06T 5/50* (2006.01)
   *G06T 7/223* (2017.01)
   *G02B 23/24* (2006.01)
   *H04N 5/225* (2006.01)

(52) U.S. Cl.
   CPC ............... *G06T 5/006* (2013.01); *G06T 5/50* (2013.01); *G06T 7/223* (2017.01); *H04N 5/2256* (2013.01); *G06T 2207/10068* (2013.01); *G06T 2207/10152* (2013.01); *G06T 2207/20221* (2013.01); *G06T 2207/30021* (2013.01); *H04N 2005/2255* (2013.01)

(56) References Cited

U.S. PATENT DOCUMENTS

| | | | |
|---|---|---|---|
| 2010/0177164 A1* | 7/2010 | Zalevsky | G01B 11/162 348/46 |
| 2011/0304705 A1* | 12/2011 | Kantor | A61B 5/0059 348/49 |
| 2012/0019836 A1 | 1/2012 | Honma et al. | |
| 2013/0321790 A1 | 12/2013 | Kirby | |
| 2014/0037146 A1* | 2/2014 | Taguchi | G01B 11/2509 382/107 |
| 2014/0146136 A1 | 5/2014 | Ge et al. | |
| 2015/0381972 A1* | 12/2015 | Kowdle | H04N 9/3191 348/51 |
| 2017/0237960 A1* | 8/2017 | Kamm | H04N 9/045 348/46 |
| 2017/0302902 A1* | 10/2017 | Martinello | H04N 13/254 |

OTHER PUBLICATIONS

Joaquim Salvi et al., "Pattern Codification Strategies in Structured Light Systems", Pattern Recognition, vol. 37, No. 4, 2004, pp. 827-849.

Sören König et al., "Image-based Motion Compensation for Structured Light Scanning of Dynamic Surfaces"; Dynamic 3D Imaging (Work-shop in Conjunction with DAGM'07), 2007, pp. 173-181.

Tak-Wai Hui, et al., "Motion-Depth: RGB-D Depth Map Enhancement with Motion and Depth in Complement," Computer Vision Foundation, Open Access Version, CVPR2014, 2014, pp. 4321-4328.

Thibaut Weise, et al., "Fast 3D Scanning with Automatic Motion Compensation," 2007 IEEE Computer Society Conference on Computer Vision and Patterns Recognition (CVPR2007), Jun. 18-23, 2007, (8 pages).

Yi Xu, et al., "High-Resolution Modeling of Moving and Deforming Objects Using Sparse Geometric and Dense Photometric Measurements," 2010 IEEE Conference on Computer Vision and Pattern Recognition (CVPR), XP031725655, Jun. 13, 2010, pp. 1237-1244.

Yeonsoo Kim, et al., "Background Elimination Technique in the Structured Light System for Dynamic Environment," 2011 15$^{th}$ International Conference on Advanced Robotics, XP032027335, Jun. 20, 2011, pp. 42-47.

Frederic Guichard, et al., "Extended Depth-of-Field using Sharpness Transport across Color Channels," Optomechatronic Micro/Nano Devices and Components III, XP002676338, vol. 7250, Jan. 1, 2009, pp. 1-12.

Jun Chen, et al., "Robot-mounted 500-fps 3-D Shape Measurement Using Motion-compensated Coded Structured Light Method," Proceedings of the 2014 IEEE International Conference on Robotics and Biomimetics (ROBIO 2014), XP032765347, Dec. 5, 2014, pp. 1989-1994.

International Search Report dated Jul. 22, 2016 in PCT/EP2016/056378 filed Mar. 23, 2016.

\* cited by examiner

IMAGING SYSTEM USING STRUCTURED LIGHT FOR DEPTH RECOVERY

BACKGROUND

Field of the Disclosure

The present disclosure relates to an imaging system using structured light for depth recovery. The disclosure further relates to an imaging method using an imaging system.

Description of Related Art

Imaging systems using structured light project a known pattern, e.g., dots, bars or grids on to a scene. Surfaces of objects in the scene distort the pattern. From the distortion the imaging system gets information about position, orientation and shape of the objects and may calculate depth information. Further, endoscope systems like industrial endoscopes for non-destructive inspection of hollows, e.g., combustion chambers, or medical endoscopes for diagnostic and minimally invasive surgery capture light from 3D scenes and project the captured light onto a 2D image sensor.

There is a need for imaging systems with enhanced imaging properties. The object of the present embodiments is achieved by the subject-matter of the independent claims. The dependent claims define further embodiments.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

According to an embodiment, an imaging system includes an optical unit that is configured to capture, from a scene, sets of first images and sets of second images, wherein the scene is illuminated with non-structured light when the sets of first images are captured and wherein the scene is illuminated with structured light when the sets of second images are captured. A pattern processing unit is configured to generate, from the second images, a recovered shadow pattern from a shadow pattern projected onto the scene during illumination with structured light, wherein at least one motion-compensated reference image is used, respectively. A depth processing unit is configured to obtain depth information on the basis of the recovered shadow pattern.

According to another embodiment an imaging method includes capturing, from a scene, sets of first images when the scene is illuminated with non-structured light and sets of second images when the scene is illuminated with structured light. From the second images, a recovered shadow pattern is generated from a shadow pattern that is projected onto the scene during illumination with structured light, wherein at least one motion-compensated reference image is used. Depth information is generated on the basis of the recovered shadow pattern.

According to a further embodiment an imaging system includes first means for capturing, from a scene, sets of first images and sets of second images, wherein the scene is illuminated with non-structured light when the sets of first images are captured and wherein the scene is illuminated with structured light when the sets of second images are captured. The image system further includes second means for generating, from the second images, a recovered shadow pattern from a shadow pattern projected onto the scene during illumination with structured light, wherein at least one motion-compensated reference image is used, respectively. The second means are coupled to the first means such that information is transmittable from the first means to the second means. The image system also includes third means for generating depth information on the basis of the recovered shadow pattern. The third means are coupled to the second means such that information is transmittable from the second means to the third means.

BRIEF DESCRIPTION OF THE DRAWINGS

In the following drawings, like reference numerals designate identical or corresponding parts throughout the several views. The elements of the drawings are not necessarily to scale relative to each other. Features of the illustrated embodiments can be combined with each other to form yet further embodiments.

DESCRIPTION OF THE EMBODIMENTS

Figure 1:
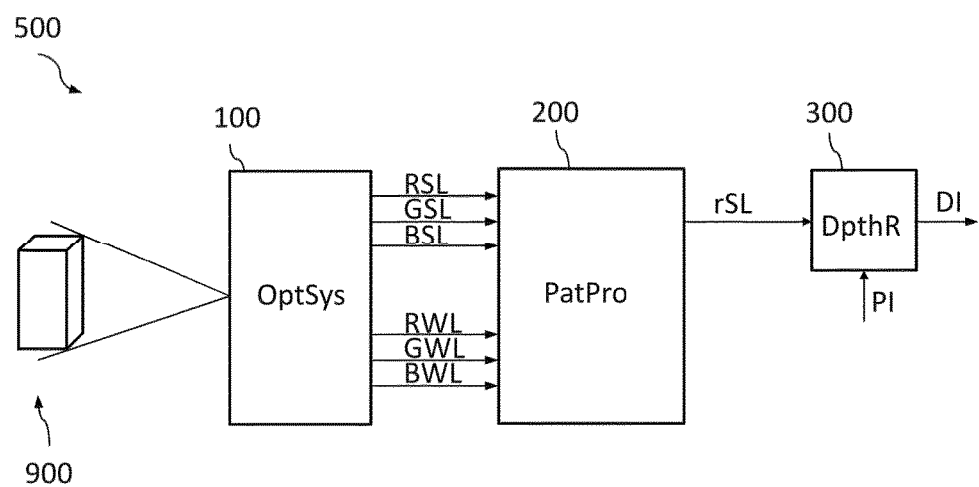
FIG. 1 is a schematic block diagram of a portion of an imaging system using structured light and motion compensation for shadow pattern recovery according to an embodiment.

FIG. 1 shows an imaging system 500 using structured light, e.g., a 3D scanner for precision shape measurement for production control, volume measurement or for precision measurement of planarity, ground surfaces, objects and body shapes. According to an embodiment, the imaging system 500 may be an industrial inspection system for non-destructive inspection of hollows such as combustion chambers, tubes or pipes, an instrument for machining surfaces in hollows, or an instrument for maintenance and repair of components accessible through narrow openings or tubes. According to an embodiment, the image system 500 is a medical endoscope for diagnostic and/or minimally invasive surgery, e.g., a laparoscope.

The imaging system 500 includes an optical unit 100 that may capture sets of first images RWL, GWL, BWL and sets of second images RSL, GSL, BSL. Each set of first images RWL, GWL, BWL may include one image, e.g., a white image, or two, three or more first images assigned to different wavelength ranges. The optical unit 100 captures the first images when a scene 900 is completely illuminated with non-structured (unstructured) light, wherein all first images of the same set are captured at the same time. The optical unit 100 may capture a corresponding set of second images RSL, GSL, BSL of the same different wavelength ranges when the same scene 900 is illuminated with structured light, wherein all second images RSL, GSL, BSL of the same set are captured at the same time. Each first image RWL, GWL, BWL may represent a colour channel of a frame including a set of first images RWL, GWL, BWL and each second image RSL, GSL, BSL may represent a colour channel of a frame including a set of second images RSL, GSL, BSL. An aperture diameter of the optical unit 100 may be less than 5 mm, e.g., at most 3 mm. The optical unit 100 may capture the sets of first images RWL, GWL, BWL and the sets of second images RSL, GSL, BSL alternatingly.

During illumination with structured light, a shadow pattern is projected on the scene 900, wherein the shadow pattern includes not-shadowing (white) portions and shadowing portions, the latter either totally shadowing (black) or partially shadowing (grey). From the sets of second images RSL, GSL, BSL a pattern processing unit 200 recovers the projected shadow patterns by background suppression, i.e., by attenuating or cancelling out the image of the scene 900. The recovered shadow pattern rSL may be a pure greyscale image obtained from either one of the second images RSL, GSL, BSL of the respective set of second images RSL, GSL, BSL or a combination of two or all of the second images of the same set of second images RSL, GSL, BSL.

Background suppression uses a reference image of the scene 900 to suppress information about the scene 900 onto which the shadow pattern is projected. In this way, background suppression reduces the effects of object reflectance and cancels out image information that may falsify the greyscale-coded shadow pattern.

According to the embodiments background suppression uses motion-compensated reference images. The motion-compensated reference images may be derived from one or more first images RWL, GWL, BWL of two or more sets of first images RWL, GWL, BWL captured at different points in time or from one or more first images RWL, GWL, BWL of one or more sets of first images RWL, GWL, BWL and non-shadowed portions of one or more second images RSL, GSL, BSL of the concerned set of second images RSL, GSL, BSL. Using motion-compensated reference images for background suppression improves an alignment between the reference image and the second images RSL, GSL, BSL, on which background suppression is applied.

A depth processing unit 300 receives the recovered shadow pattern rSL and further receives or holds pattern information PI descriptive for the original shadow pattern applied during illumination of the scene 900 with the structured light. Considering the pattern information PI, the depth processing unit 300 applies optical triangulation on the recovered shadow pattern rSL and obtains depth information DI concerning picture details, objects, single pixels or pixel groups in the second images RSL, GSL, BSL.

Illuminating the scene 900 with structured light allows the imaging system 500 to gain depth information DI, which is nearly independent of the image content, over the complete field of view. The depth information DI may be used to provide a user of the imaging system 500 with further information as regards the scene 900. For example, the depth information DI may be used for a 3D representation of the scene 900 on a monitor or display. Using motion compensated reference images avoids that motion in the scene 900 or a movement of the tip portion of the imaging system 500 in the direction of the scene 900 temporarily delivers erroneous depth information DI which may result in artefacts in the 3D representation of the scene 900. The depth information DI is more accurate and more robust than without using motion-compensated reference images. Operation of the imaging system 500 is steady and not adversely affected by temporarily invalid depth information. The imaging system 500 improves the structured light approach by using white light images or image portions to compensate for unknown object reflectance.

Each of the pattern processing unit 200 and the depth processing unit 300 is a functional block, e.g., a software program, an electronic circuit or a combination of a software program and an electronic circuit, wherein the software program is a program code executed in a processor or controller.

Figure 2A:
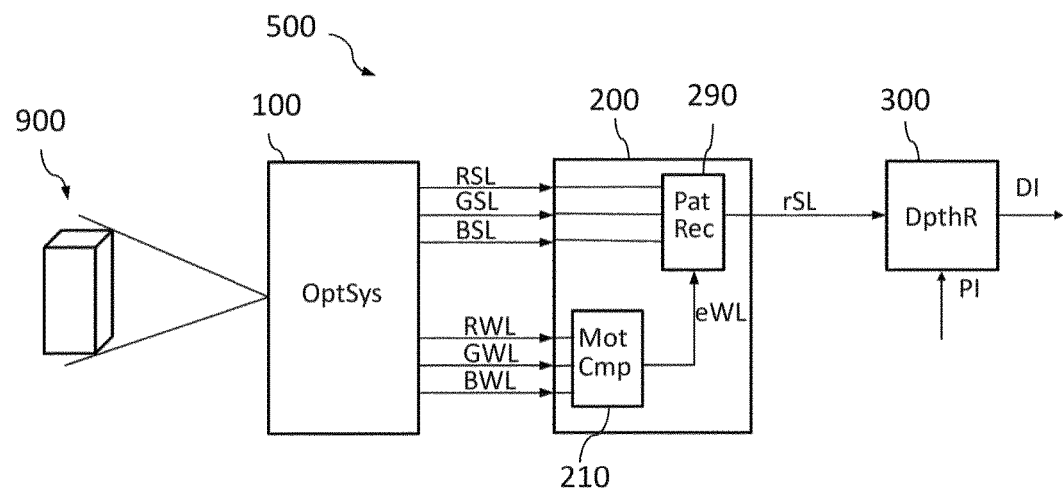
FIG. 2A is a schematic block diagram of a portion of an imaging system according to an embodiment using structured light and motion compensation for shadow pattern recovery, wherein motion compensation is based on images obtained by illumination with non-structured light.

FIG. 2A concerns an imaging system 500 exclusively using the first images RWL, GWL, BWL to obtain a motion-compensated reference image eWL for background suppression in a set of second images RSL, GSL, BSL or in an image derived from a set of second images RSL, GSL, BSL.

The pattern processing unit 200 includes a motion compensation unit 210 that receives one, two, or all first images RWL, GWL, BWL of a first set of first images captured before a set of second images RSL, GSL, BSL as well as one, two, or all first images RWL, GWL, BWL of a second set of first images captured after the set of second images RSL, GSL, BSL. The motion compensation unit 210 estimates displacement vectors for pixels, objects and/or pixel groups in the sets of first images RWL, GWL, BWL and generates one or more motion-compensated non-shadowed motion-compensated reference images eWL, e.g., an estimated non-shadowed white image eWL or a set of colour reference images for that point in time at which the set of second images RSL, GSL, BSL is captured.

A pattern recovery unit 290 uses the motion-compensated reference image eWL or the set of motion-compensated colour reference images for suppressing the scene-dependent background in the second images RSL, GSL, BSL. For example, the scene-dependent background may be suppressed, e.g., by subtracting, pixel-by-pixel, pixel values of the motion-compensated reference images eWL from the pixel values of corresponding pixels in the corresponding second images RSL, GSL, BSL or from a white image obtained by combining at least two or all second images RSL, GSL, BSL of the same set. According to an embodiment, background suppression is based on a division of the structured light information SL(2n) by the motion-compensated reference image(s) eWL(2n). For example, the recovered pattern information rSL is obtained based on equation (1):

$$rSL = (2^{bitdepth}) * SL / eWL \quad (1)$$

with SL representing the structured light information, eWL representing the motion-compensated reference image and rSL representing the recovered pattern information.

Figure 2B:
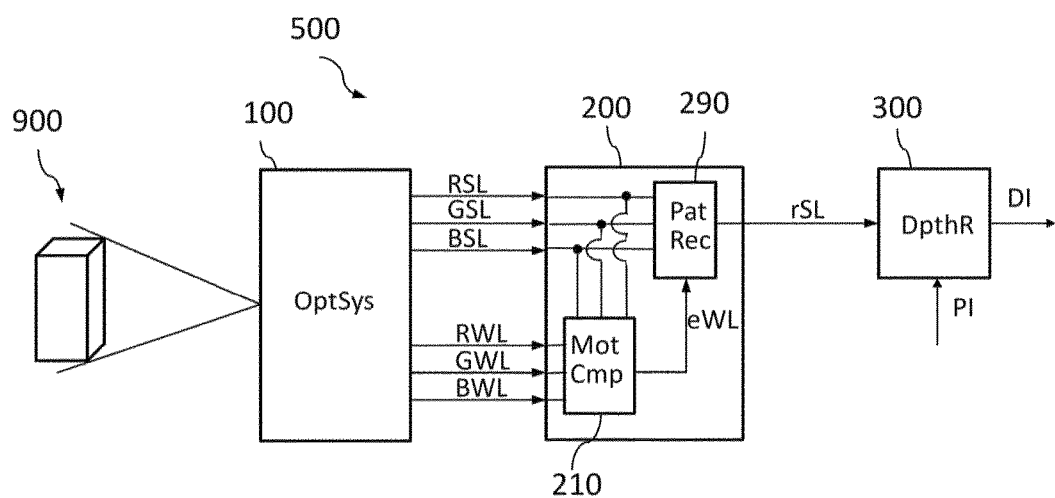
FIG. 2B is a schematic block diagram of a portion of an imaging system according to an embodiment using structured light and motion compensation for shadow pattern recovery, wherein motion compensation is based on images obtained by illumination with both structured light and non-structured light.

In FIG. 2B an imaging system 500 uses those portions of the second images RSL, GSL, BSL on which no shadow pattern is projected to obtain motion-compensated reference images eWL for background suppression in a set of second images RSL, GSL, BSL.

The motion compensation unit 210 receives one, two, or all second images RSL, GSL, BSL of a set of second images and may further receive one, two, or all first images RWL, GWL, BWL of at least one first set of first images captured before or after the concerned set of second images RSL, GSL, BSL. The motion compensation unit 210 estimates final displacement vectors for pixels, objects and/or pixel groups in the second images and generates one or more non-shadowed motion-compensated reference images eWL, e.g., an estimated white image or a set of colour reference images for that point in time at which the set of second images RSL, GSL, BSL is captured.

A pattern recovery unit 290 uses the motion-compensated reference image eWL or the set of motion-compensated colour reference images for suppressing the scene-dependent background in the second images RSL, GSL, BSL, e.g., by subtracting pixel values of the reference images from the pixel values of corresponding pixels in the corresponding second images RSL, GSL, BSL.

For interpolating the motion-compensated reference images eWL for a point in time $t_n$ from first images RWL, GWL, BWL obtained at points in time $t_{n-1}$ and $t_{n+1}$, the imaging system 500 of FIG. 2A assumes a linear movement when motion is detected. Instead, the imaging system 500 of FIG. 2B is based on an in-frame estimation that gets along without temporal interpolation. The depth information DI is more robust, because non-linear motion adversely affects the estimation to a lower degree. According to an embodiment motion estimation may be mainly or exclusively based on the non-shadowed areas. From the motion vectors obtained from the non-shadowed areas, information about linearity of the motion may be derived and used to improve the motion vector ratio.

Figure 3A:
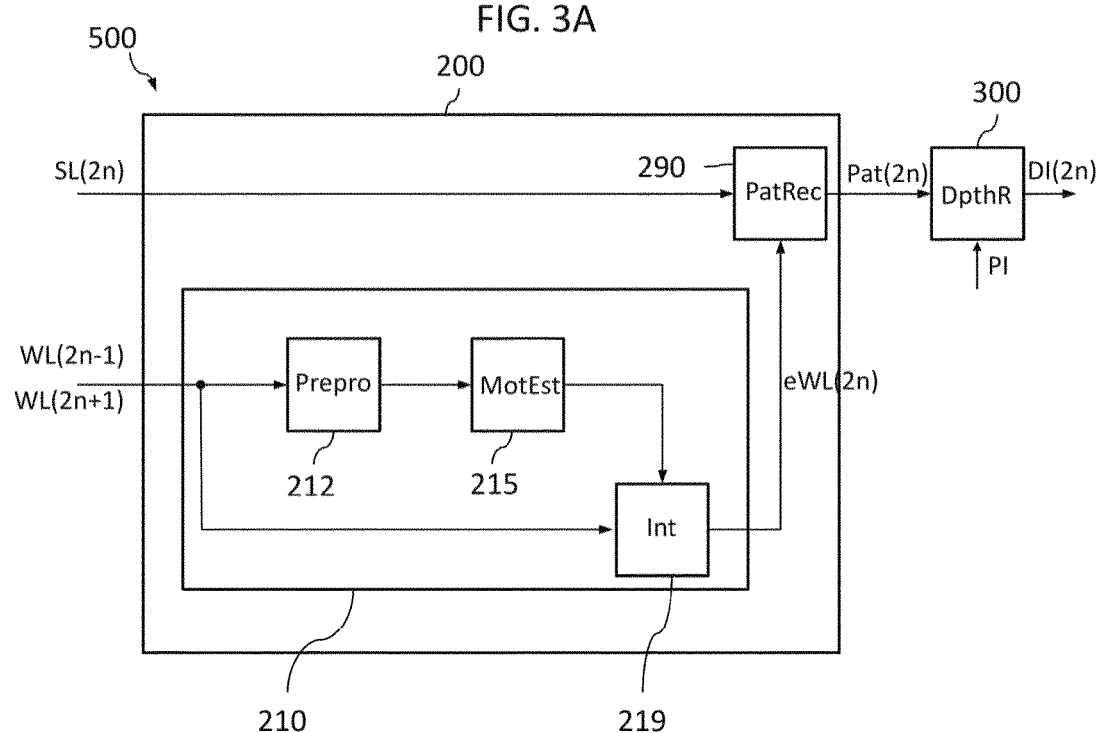
FIG. 3A is a schematic block diagram showing details of a motion compensation unit of the imaging system of FIG. 2A according to an embodiment.

FIG. 3A refers to details of the pattern processing unit 200 of FIG. 2A. The pattern processing unit 200 receives structured light information SL(2n) captured at $t=2n\Delta t$, with n being an integer value and $\Delta t$ denoting the time interval between two successive captures. The structured light information SL(2n) may be a set of second images of different wavelength ranges captured at $t=2n\Delta t$, any single second image, i.e., any colour channel of the concerned set of second images or one single combined image obtained by adding up pixel values of corresponding pixels in at least two second images RSL, GSL, BSL of the same set at predetermined weights. According to an embodiment, the structured light information SL(2n) may be a structured white image obtained from the colour channels RSL, GSL, BSL.

A motion compensation unit 210 of the pattern processing unit 200 receives non-structured light information WL(2n−1) captured at $t=(2n-1)\Delta t$ directly before the structured light information SL(2n) and WL(2n+1) captured at $t=(2n+1)\Delta t$ directly after the structured light information SL(2n). Each of the two sets of non-structured light information WL(2n−1), WL(2n+1) obtained by non-structured illumination may include a set of first images RWL, GWL, BWL assigned to different wavelength ranges, one single first image RWL, GWL, BWL of a set of first images or any combination of at least two of the first images RWL, GWL, BWL of the same set. According to an embodiment, the non-structured light information WL(2n−1), WL(2n+1) may be obtained by adding up pixel values of corresponding pixels in all first images RWL, GWL, BWL of the same set, wherein a weight of the pixel values of each first image RWL, GWL, BWL depends on the wavelength range the image is assigned to.

A preprocessing unit 212 may perform at least one of scaling, contrast enhancement, and frequency manipulation such as low-pass filtering or high-pass filtering, by way of example.

A motion estimation unit 215 calculates displacement vectors DV descriptive for a displacement of pixels assigned to a moving object between the non-structured light information WL(2n−1) at $t=(2n-1)\Delta t$ and the non-structured light information WL(2n+1) at $t=(2n+1)\Delta t$. From the displacement vectors DV an interpolation unit 219 estimates the position of the concerned objects at $t=2n\Delta t$. For example, the interpolation unit 219 assumes a linear movement, reduces the length of the displacement vectors DV by 50%, and applies the reduced final displacement vectors to the non-structured light information WL(2n−1) or, with the inversed direction, on the non-structured light information WL(2n+1) to obtain estimated non-structured light information representing one or more motion-compensated reference images eWL(2n) for $t=2n\Delta t$. The motion-compensated reference images eWL(2n) may represent an estimation for a white light image, an estimation for one of the colour channels RWL, GWL, BWL or may include independent estimations for at least two or all of the colour channels RWL, GWL, BWL. The motion-compensated reference image(s) eWL (2n) represents(s) an estimation for an image obtained at $t=2n\Delta t$, i.e., at the same point in time when the structured light information SL(2n) is obtained, but under illumination with non-structured light instead of illumination under structured light.

A pattern recovery unit 290 uses the motion-compensated reference image(s) eWL(2n) to suppress the background in the structured light information SL(2n) and to obtain the recovered pattern information rSL(2n) for $t=2n\Delta t$.

A depth recovery unit 300 uses the recovered shadow pattern SL(2n) for retrieving the depth information DI. When the shadow pattern is projected onto a scene, the different distances of objects in the scene distort the projected shadow pattern for an observer distant to an optical axis of a projection unit. By comparing corresponding points in the projected shadow pattern and the original shadow pattern described by the pattern information PI, the depth recovery unit 300 can retrieve depth information DI at least for pixels on edges of the structured light pattern. Thereby background suppression in the pattern recovery unit 290 reduces the influence of image information about the scene on the depth recovery mechanism. Motion compensation in the motion compensation unit 210 makes the background suppression more independent from both a movement of the optical unit 100 of the imaging system 500, e.g., the tip of an endoscope and a motion within the field of view.

Figure 3B:
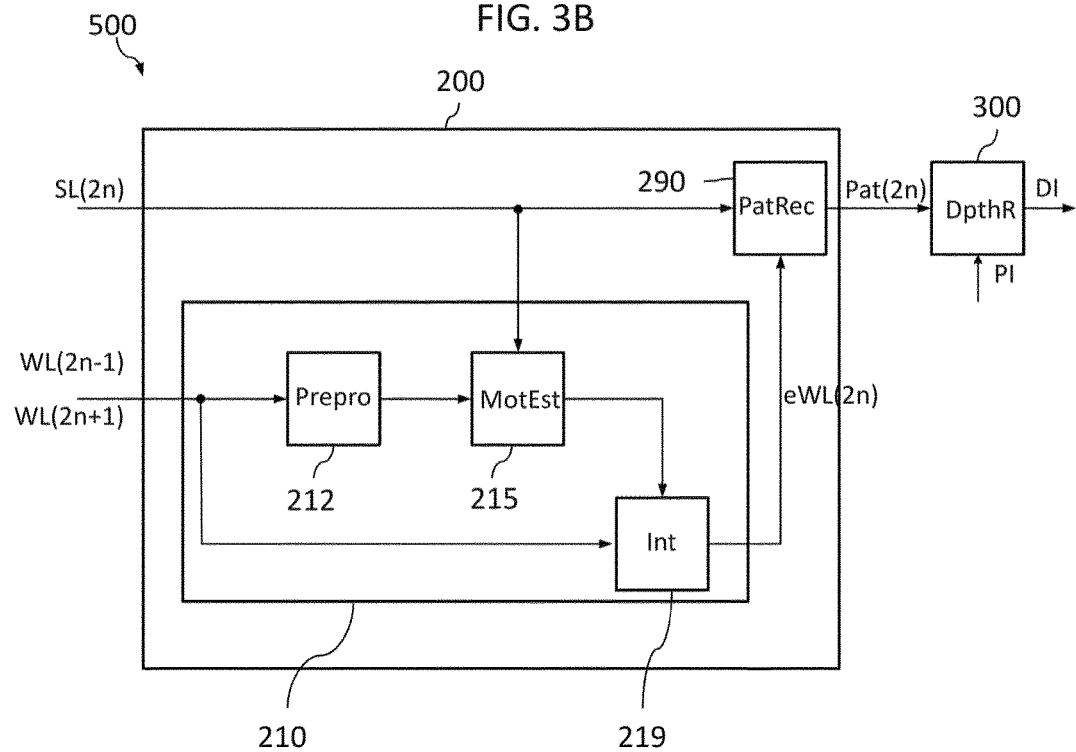
FIG. 3B is a schematic block diagram showing details of a motion compensation unit of the imaging system of FIG. 2B according to another embodiment.

The pattern processing unit 200 of FIG. 3B corresponds to the pattern recovery unit 200 of FIG. 2B. Instead of using two different time instances of the non-structured light information WL, the motion estimation unit 215 uses structured light information SL(2n) at $t=2n\Delta t$. Since the estimation uses information obtained from the time instance of the structured light information SL(2n) the displacement vectors cross the SL frame at integer pixel grid. As a consequence, the displacement vector field is dense at t=2nΔt, which is not the case in the embodiment of FIG. 3A because in FIG. 3A the pattern processing unit 200 uses vector projection for the intermediate time instance 2n. In addition, estimation of the motion-compensated reference images eWL(n) does not assume a linear movement.

The motion compensation unit 210 as illustrated in FIGS. 3A and 3B may include at least one of a phase correlation unit, a recursive block matching unit, and an optical flow unit or any combination thereof.

Figure 4:
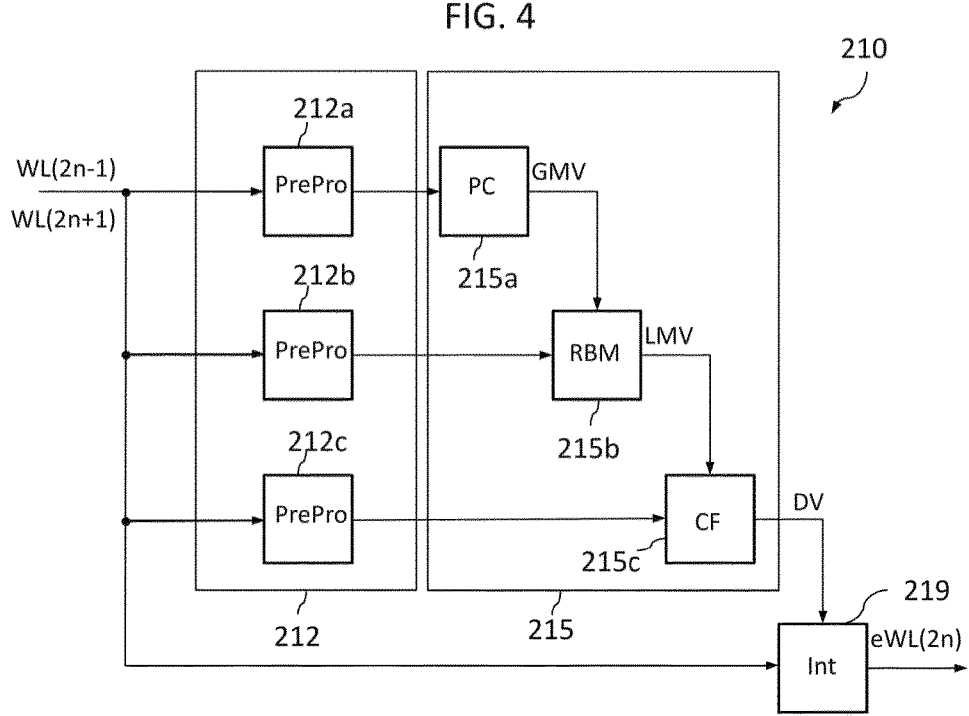
FIG. 4 is a schematic block diagram showing details of a motion compensation unit according to an embodiment concerning multi-stage motion estimation.

FIG. 4 illustrates a multi-stage motion compensation unit 210 including a phase correlation unit 215a, a recursive block matching unit 215b and an optical flow unit 215c, wherein motion information obtained in a previous stage is used in a subsequent stage.

The phase correlation unit 215a computes a global motion vector GMV descriptive for a shift between two image regions of interest in the non-structured light information WL(2n−1), WL(2n+1), by means of a linear phase term in the Fourier domain. Since the Fourier transformation supposes an infinite periodic signal, which actually does not exist for the regions of interest, the largest movement which can be measured is given by the assignment resolution. On the other hand, the presences of noise as well as luminance changes in the scene affect the estimation of the global motion vector GMV only to a low degree.

The recursive block matching unit 215b estimates local motion vectors LMV for blocks of pixels in the non-structured light information WL(2n−1), WL(2n+1), respectively. The recursive block matching unit 215b may use the global motion vector GMV obtained from the phase correlation unit 215a as a global predictor for the local motion vectors LMV.

The optical flow unit 215c estimates the displacement vectors DV, which may be floating point accurate vectors for each pixel, on the basis of auxiliary images obtained by partially motion-compensating the non-structured light information WL(2n−1), WL(2n+1) with the local motion vectors LMV. From the displacement vectors DV, the interpolation unit 219 estimates the final displacement vectors for t=2nΔt.

The preprocessing unit 212 may include a first subunit 212a preconditioning the non-structured light information WL(2n−1), WL(2n+1) for the phase correlation unit 215a, a second subunit 212b preprocessing the non-structured light information WL(2n−1), WL(2n+1) for the recursive block matching unit 215b and a third subunit 212c preprocessing the non-structured light information WL(2n−1), WL(2n+1) for the optical flow unit 215c.

The shadow pattern that is projected onto the scene during capture of the structured light images SL(2n) includes not-shadowed portions and shadowed portions, wherein the latter are either totally shadowed or partially shadowed. A greyscale or grey level of the shadowed portions may be coded to avoid ambiguities in the mapping between the original pattern and the projected pattern. The shadowing portions may form a 1D pattern, e.g., a stripe pattern with variations along one direction, or a 2D pattern, e.g., a dot or grid pattern with variations along two orthogonal directions. The shadow pattern may be a Gray-coded composite pattern to reduce possible ambiguities when the structured light pattern is recovered.

Figure 5:
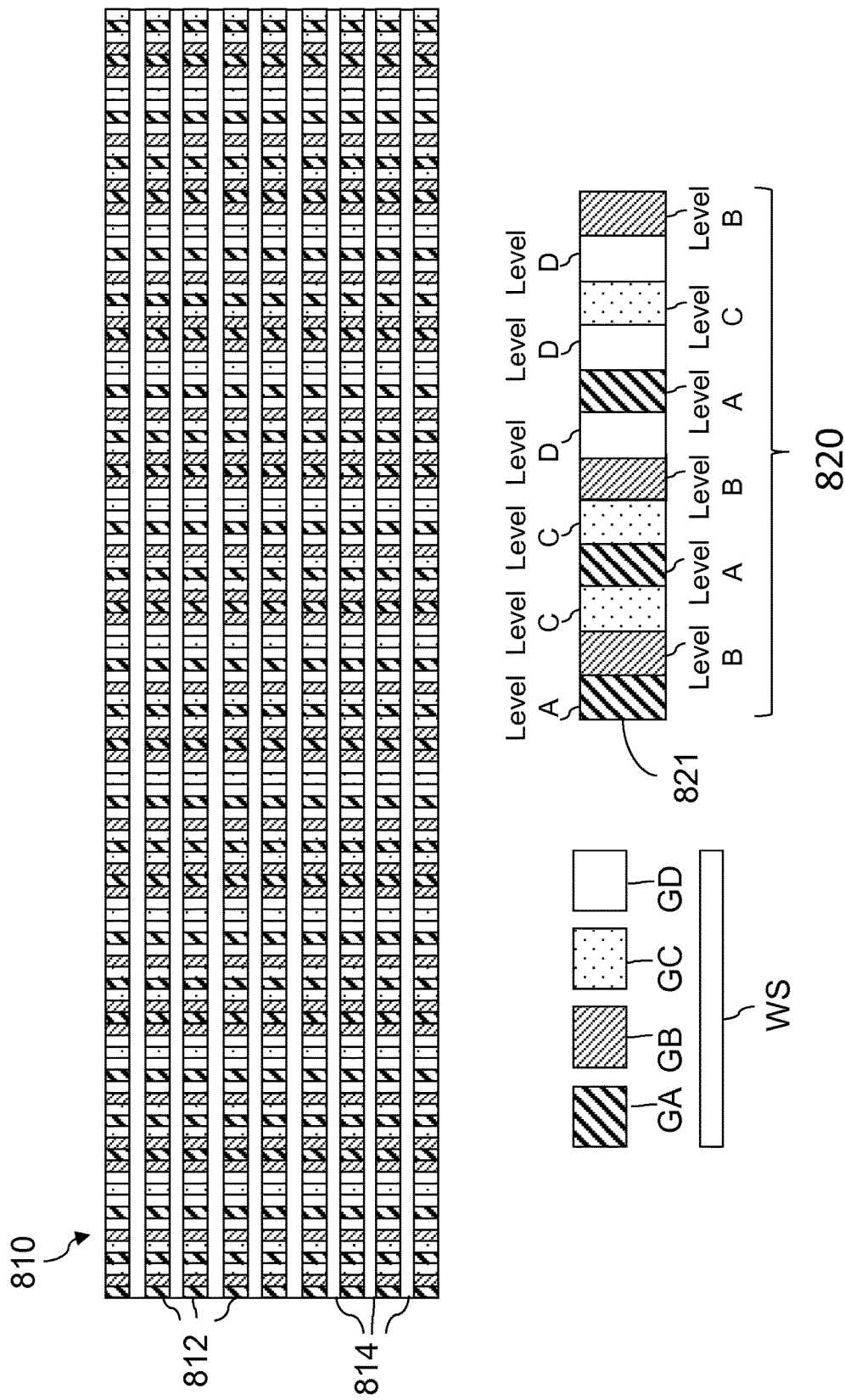
FIG. 5 is a schematic diagram showing a shadow pattern according to an embodiment.

In the shadow pattern 810 illustrated in FIG. 5 white lines 814, which have the grey level "white" WS, separate neighbouring code lines 812. Each code line 812 includes a repetitive pattern 820 that may include a number of fields 821 of different grey levels different from the grey level "white". According to the illustrated embodiment, the repetitive pattern 820 includes twelve fields 821 with four different grey levels GA, GB, GC, GD between the grey levels "black" and "white" such that the shadow pattern 810 includes five different grey levels in total.

Referring again to FIG. 1, the optical unit 100 may include an achromatic lens unit. By contrast, the embodiment described in the following Figures integrates depth recovery based on structured light and motion-compensated reference images for background suppression in an imaging system in which a hyperchromatic lens expands the working range.

Figure 6:
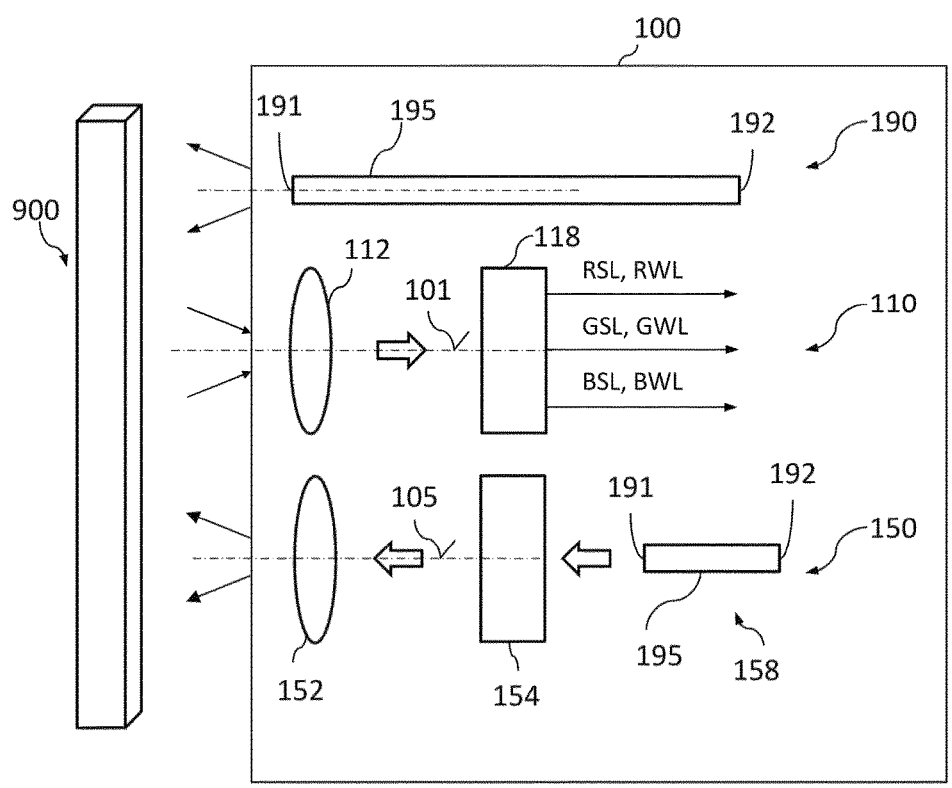
FIG. 6 is a schematic block diagram of an optical unit according to an embodiment based on a hyperchromatic lens unit.

FIG. 6 refers to details of an optical unit 100 with a hyperchromatic lens. An illumination unit 190 completely illuminates a scene 900 during capture of sets of first images RWL, GWL, BWL, wherein during the capture of each set of first images RWL, GWL, BWL, the light that illuminates the scene 900 is not structured. A projection unit 150 illuminates the scene during capture of sets of second images RSL, GSL, BSL with structured light. The illumination unit 190 and the projection unit 150 may be alternatingly active. An imaging unit 110 includes an imaging lens unit 112 with longitudinal chromatic aberration. The imaging lens unit 112 is effective as a hyperchromatic lens and projects the scene 900 onto an imaging sensor unit 118 that captures sets of first and sets of second images RWL, GWL, BWL, RSL, GSL, BSL by transforming the impinging light into electric signals or digital information representing the first and second images RWL, GWL, BWL, RSL, GSL, BSL.

The illumination unit 190 may include one or more optical fibres 195 with exit face(s) 191 oriented to the scene 900 and junction face(s) 192 connectable to an external light source. During capture of the first images RWL, GWL, BWL, the optical fibres 195 supply white light or a plurality of narrow wavelength ranges to the scene 900, wherein the narrow wavelength ranges may be in a wavelength range containing visible light, UV (ultraviolet) radiation and IR (infrared) radiation.

According to another embodiment, the illumination unit 190 may include one or more active light sources such as LEDs (light emitting diodes) integrated in a housing encasing the optical unit 100. The light source may emit white light or a plurality of narrow wavelength ranges in a wavelength range containing visible light, UV radiation and IR radiation.

The illumination unit 190 is arranged to illuminate the scene 900 with radiation at least in a wavelength range used by the imaging sensor unit 118. For example, if the imaging sensor unit 118 senses red, green and blue wavelength ranges, the illumination unit 190 illuminates the scene 900 in at least the red, green and blue wavelength ranges, e.g., in a wavelength range from at least red light to at least blue light. If the imaging sensor unit 118 is sensitive to IR radiation, the illumination unit 190 may illuminate the scene in the IR band.

The projection unit 150 includes a projection illumination unit 158, a projection lens unit 152 arranged between the illuminated scene 900 and the projection illumination unit 158, and an optical element 154 in the optical path of the projection unit 150.

The projection illumination unit 158 may include one or more optical fibres 195 with exit face(s) 191 oriented to the scene 900 as well as junction face(s) 192 connectable to an external light source. According to another embodiment, the projection illumination unit 158 includes one or more active light sources such as LEDs integrated in a housing encasing the optical unit 100. The projection illumination unit 158 may emit radiation of the same spectral distribution as the illumination unit 190. According to a further embodiment, a common optical fibre, optical fibre bundle, or active light source is alternatingly effective as the illumination unit 190 and the projection illumination unit 158, e.g., by means of a switchable light gate or deflector.

The projecting lens unit 152 may be a lens system with longitudinal chromatic aberration. According to an embodiment, the projecting lens unit 152 shows the same longitudinal chromatic aberration characteristics as the imaging lens unit 112 such that the structured light pattern can be detected and processed more reliably, because it is sharp in at least one colour channel. In addition, a hyperchromatic projection lens unit 152 may inversely compensate for a lateral chromatic aberration and distortion of the imaging lens unit 112.

The optical element 154 may be a micro-structured reticle with an optic pattern that may be imprinted on a surface of the reticle. The optical element 154 is arranged on the optical axis 105 between the projection illumination unit 158 and the illuminated scene 900 acts as a reticle, wherein the optic pattern generates a grey-level shadow pattern which is projected onto portions of the scene 900, which during capture of the second images RSL, GSL, BSL is at least partially shadowed, i.e., not illuminated homogeneously.

The imaging lens unit 112 and the imaging sensor unit 118 of the imaging unit 110 are arranged along an optical axis 101 which is not identical with the optical axis 105 of the projection unit 150. The optical axes 101, 105 of the imaging unit 110 and the projection unit 150 may intersect with each other. According to another embodiment, the optical axes 101, 105 may be parallel to each other, wherein a distance between the optical axes 101, 105 is at most the diameter of the optical unit 100 which determines the spacing between the imaging lens unit 112 and the projecting lens unit 152. The imaging and projection units 110, 150 have at least approximately the same field of view and may be aligned to each other in a side-by-side or in a top-bottom arrangement. Both optical systems have a small intraocular distance less than 2.5 mm, e.g., in a range from 2 mm to 2.5 mm and the complete system dimensions may be comparable to current laparoscopic devices, by way of example.

Figure 7A:
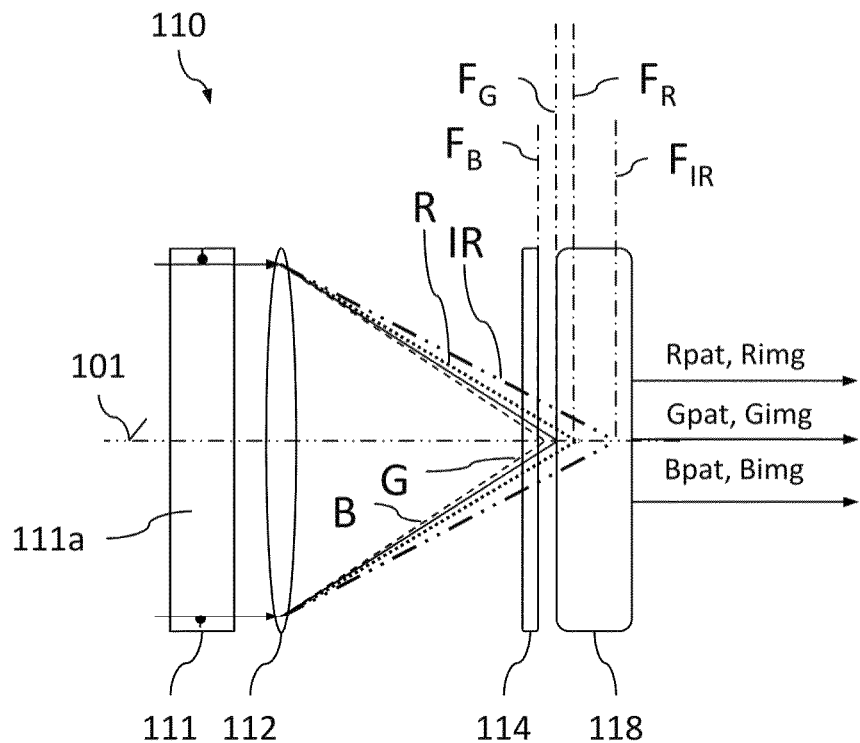
FIG. 7A is a schematic diagram showing details of an imaging unit of the optical unit illustrated in FIG. 6.
Figure 7B:
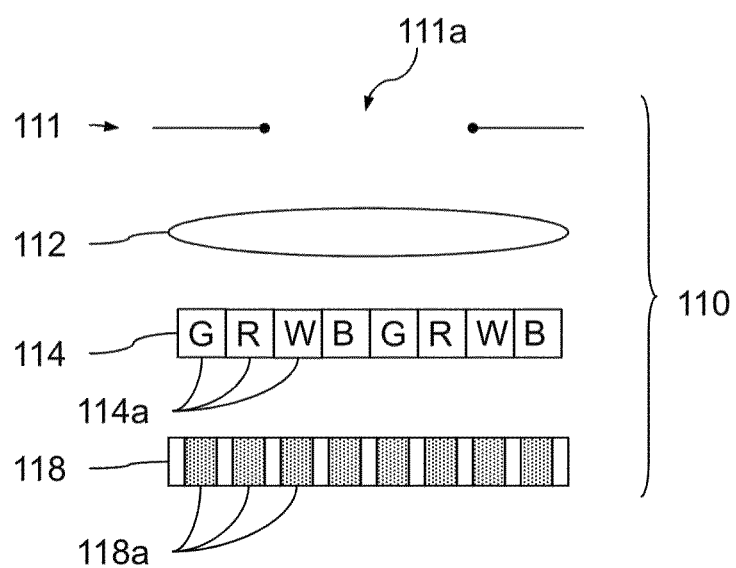
FIG. 7B is a schematic cross-section of the imaging unit of FIG. 7A.

FIGS. 7A and 7B show the imaging unit 110 in more detail. During capture of the scene, radiation that may contain visible light, UV radiation and IR radiation and that is descriptive for an image of the scene, passes through an aperture 111a of an aperture unit 111 as well as through the imaging lens unit 112 and incidents onto an imaging sensor unit 118. The size of the aperture 111a may be fixed or controllable.

The imaging lens unit 112 shows longitudinal chromatic aberration and may image, e.g., infrared radiation in a first focal plane FIR, visible red light in a focal plane FR, green light in a focal plane FG and blue light in a focal plane FB. The imaging lens unit 112 may be a micro-lens array including a plurality of segments, wherein each lens segment of the imaging lens unit 112 may be assigned to one single pixel sensor 118a of the imaging sensor unit 118 and to one colour filter section 114a of a colour filter unit 114.

According to an embodiment the imaging lens unit 112 may be a compound lens formed of a highly dispersive material like glass or plastics, where the index of refraction is a function of the wavelength of the incident light and the focal length varies as a function of the wavelength accordingly. The imaging lens unit 112 may include compensation elements compensating for spherical and/or field dependent aberrations such that the imaging lens unit 112 exhibits no or only negligible spherical and field dependent aberrations. The imaging lens unit 112 may be designed to compensate for different magnification ratios in the different focal planes.

Due to the longitudinal chromatic aberration of the imaging lens unit 152, the colour images blue, green, red and infrared focus at different distances from near too far. By exchanging sharpness among the colour images, a working range of the imaging unit 110 may be expanded.

In the following, sub-ranges of the visible spectrum as well as wavelength ranges next to the visible spectrum such as IR and UV are referred to as 'colour', irrespective of whether or not the wavelength range is perceptible by the human eye. For example, a 'colour filter' may also be a filter letting exclusively pass radiation in the IR or UV spectral range.

The imaging sensor unit 118 includes a plurality of pixel sensors 118a, wherein each pixel sensor 118a contains a photo sensor that converts a photo signal from the incident light into an electronic signal. The pixel sensors 118a may be formed in a semiconductor substrate in one plane or in different planes. A pitch (centre-to-centre) distance of the pixel sensors may be in a range from 0.5 μm to 2 μm. According to an embodiment the imaging sensor unit 118 may be an HD (high definition) image sensor with a resolution of about 2 MP.

For example, the imaging sensor unit 118 may have a vertically integrated photodiode structure with deep photodiodes formed in a substrate section a few microns beneath surface photodiodes, which are formed along a substrate surface of a semiconductor substrate. Visible light is absorbed in the surface section of the semiconductor substrate, whereas infrared radiation penetrates deeper into the semiconductor substrate. As a result, the deep photodiodes receive infrared radiation only. According to another embodiment the imaging sensor unit 118 may have a lateral integrated photodiode structure with the photodiodes arranged in an array.

A colour filter unit 114 may be arranged between the imaging lens unit 112 and the imaging sensor unit 118 or between the aperture unit 111 and the imaging lens unit 112. The colour filter unit 114 may be arranged in close contact to the imaging sensor unit 118 and may include a plurality of colour filter sections 114a, wherein each colour filter section 114a has a filter colour, for example green, red, blue, magenta, yellow, white, IR, or UV.

Each colour filter section 114a may be assigned to one single pixel sensor 118a such that each pixel sensor 118a receives colour-specific image information. For example, the colour filter sections 114a may be arranged matrix-like in columns and rows. Colour filter sections 114a assigned to different filter colours may alternate along the row direction and the column direction in a regular manner. For example, each group of four colour filter sections 114a forming a 2×2 matrix may form a Bayer mosaic pattern, wherein colour filter sections 114a with the filter colour "green" are arranged on a first diagonal of the 2×2 matrix, and one colour filter section 114a with a filter colour "red" and one colour filter section 114a with the filter colour "blue" are arranged on the other diagonal of the 2×2 matrix. With the Bayer mosaic pattern, the sampling rate for the filter colour "green" is twice that of the filter colours "red" and "blue" to take into account that the colour green carries most of the luminance information for the human eye. According to other embodiments, some of the colour filter sections 114a may be transparent for cyan light, yellow light, IR radiation, UV radiation or for white light.

Figure 7C:
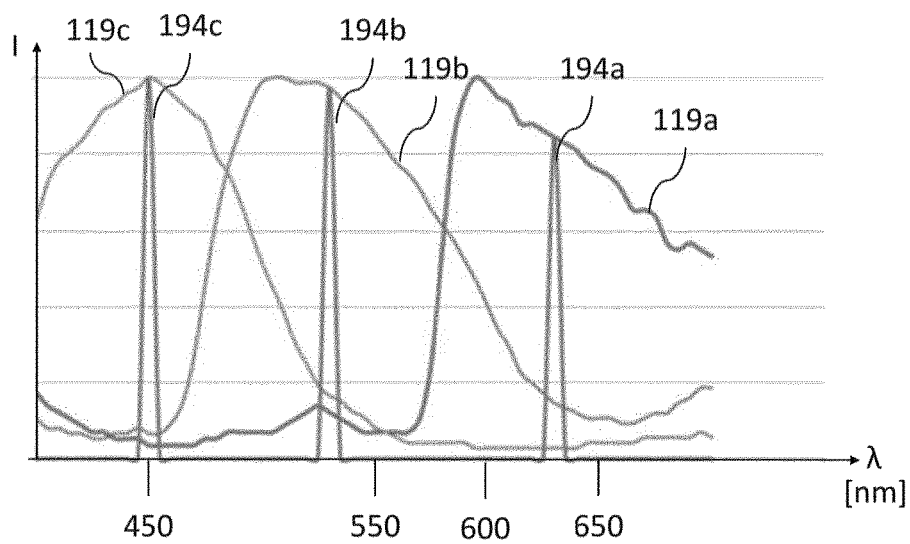
FIG. 7C is a schematic diagram showing emission spectra of illumination units for discussing effects of embodiments using narrowband illumination.

The diagram of FIG. 7C refers to an embodiment using narrowband laser radiation for illuminating a scene with structured and with non-structured light. For example, both the illumination unit 190 and the projection illumination unit 158 illuminate the scene with red, green and blue laser light 194a, 194b, 194c as illustrated in the diagram, which in addition shows the colour filter transmission characteristics 119a, 119b, 119c for red, green and blue colour filter sections 114a as illustrated in FIG. 7B. The use of quasi-discrete wavelengths results in sharper first and second images since no wavelength dependent magnification can blur the first and second images.

Figure 8:
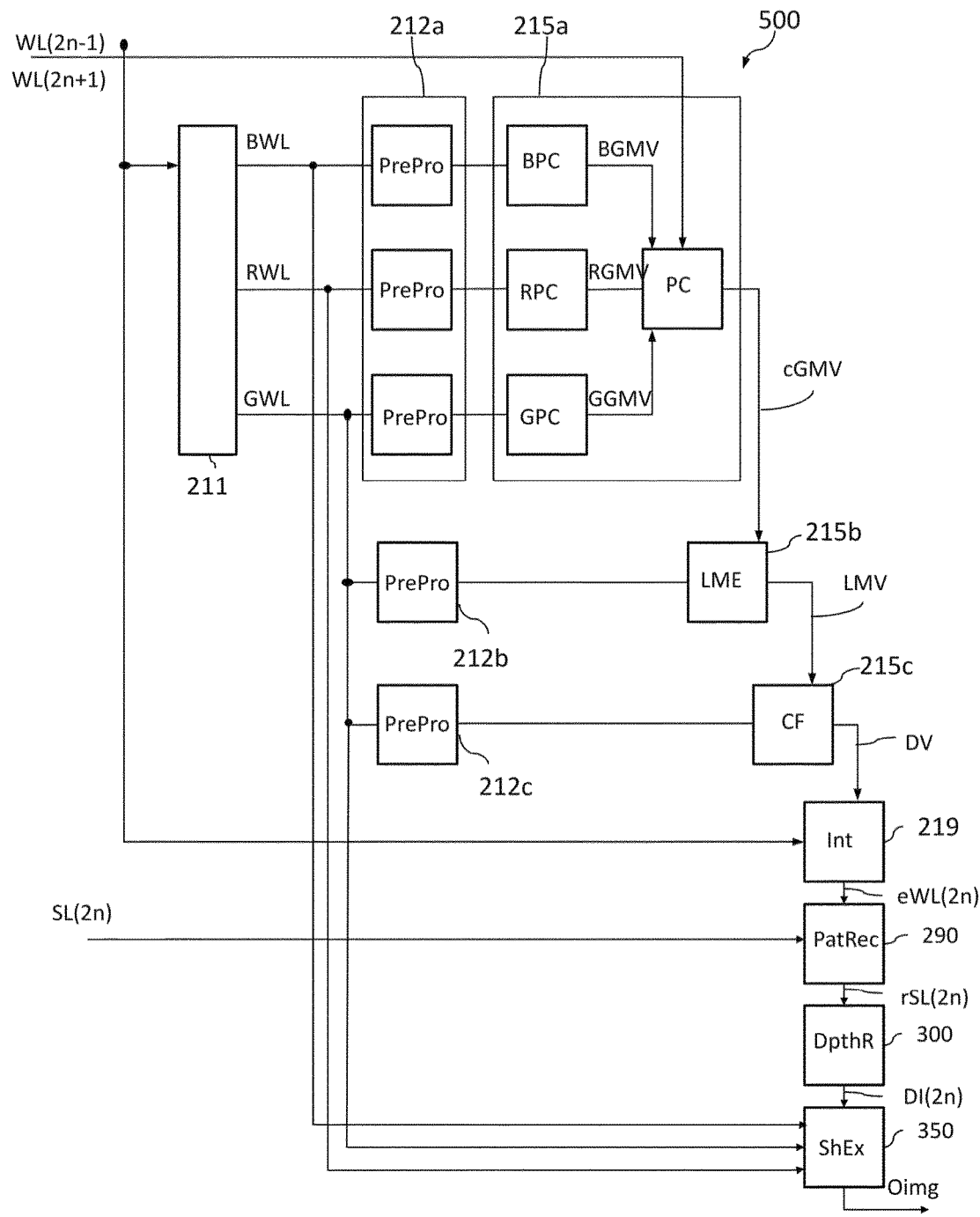
FIG. 8 is a schematic block diagram of a portion of an imaging system according to an embodiment using a hyperchromatic lens.

FIG. 8 shows a portion of an imaging system 500 processing images obtained with an optical unit 100 with a hyperchromatic lens to retrieve depth information DI on the basis of structured light illumination.

A pattern processing unit 210 may receive non-structured light information WL(2n−1) for t=(2−1)Δt and WL(2n+1) for t=(2n+1)Δt. From the non-structured light information WL(2n−1) and WL(2n+1) a colour splitting unit 211 separates sets of first images RWL, GWL, BWL, which may correspond to colour channels red, green and blue. Since for a hyperchromatic lens a scene is imaged into different focal planes, phase correlation for the different colour channels may result in different global motion for each colour channel. According to the illustrated embodiment, the phase correlation unit 215 may calculate, for each colour channel separately, a colour-specific general motion vector RGMV, GGMV, BGMV. The phase correlation unit 215a may then merge information all three colour-specific global motion vectors RGMV, GGMV, BGMV to obtain a combined global motion vector cGMV, wherein the combination may be based on a post-match or on an assessment of blur in the colour channels, by way of example.

The phase correlation unit 215a outputs the combined general motion vector cGMV to the recursive block matching unit 215b. Calculation of the local motion vectors LMV and the displacement vectors DV may use only one of the colour channels, for example the green colour channel which transports the most luminance information for human perception. The presence of blur in the selected colour channel affects the estimation of the local motion vectors LMV and the displacement vectors DV only to a low degree and may even improve convergence of the algorithms. Omitting the estimation of local motion vectors LMV and the displacement vectors for the other colour channels significantly reduces the total number of operations such that calculation resources may be saved.

An interpolation unit 219 receives the combined general motion vector cGMV and may estimate the motion-compensated reference image eWL(2n). A pattern recovery unit 290 uses the motion-compensated reference image eWL(2n) for obtaining the recovered shadow pattern SL(2n) by background suppression. From the recovered shadow pattern SL(2n) a depth recovery unit 300 retrieves depth information DI using pattern information PI on the original pattern. For further details, reference is made to the embodiments described in FIGS. 1, 2A, 2B, 3A, 3B and 4.

In addition, a sharpness processing unit 350 may receive the depth information DI as well as the first images RWL, GWL, BWL and may use the depth information DI to exchange sharpness information among the first images RWL, GWL, BWL in order to obtain improved versions of the first images RWL, GWL, BWL. The sharpness processing unit 350 further combines the improved versions of the first images RWL, GWL, BWL to generate an output image OImg.

Before exchanging sharpness information, the sharpness processing unit 350 may compare, for single pixels, pixel groups and/or objects in the first images RWL, GWL, BWL of each set values descriptive for sharpness in the respective image portion, e.g., a content of high spatial frequencies, and may identify, e.g., by using the depth information DI that one which contains the sharpest information about the concerned single pixel, pixel group or object.

When exchanging sharpness information, the sharpness processing unit 350 may transport the sharpness information from that first image RWL, GWL, BWL, which carries the highest spatial frequencies in the region of interest, to the other first images RWL, GWL, BWL to obtain improved versions of the first images RWL, GWL, BWL, wherein the depth information DI may identify the sharpest channel and high spatial frequencies of the sharpest one of the first images RWL, GWL, BWL for the respective image region are copied into the other first images RWL, GWL, BWL. For example, to each blurred sub-region of one of the first images RWL, GWL, BWL a high-pass filtered version of the sharpest first image RWL, GWL, BWL for the respective sub-region may be added or superposed. The strength of the high-pass may be set according to an actual depth since a-priori-knowledge exists about the lens characteristics.

The sharpness processing unit 350 combines the improved versions of the first images to obtain a nearly all-in-focus output image OImg, which may be a colour or greyscale image. According to an embodiment, the sharpness processing unit 350 may also combine the output image OImg with the depth information DI to generate an improved output image visualizing a depth information for each pixel, e.g., by a colour-coded 2D representation or by a 3D representation.

The output image OImg or the improved output image may be stored in a non-volatile memory of the imaging system, for example as a set of digital values representing a greyscale or colour image. Alternatively or in addition, the output images OImg or the improved output images may be displayed on a display device of the imaging system, may be output to another system connected to the imaging system through a wired or wireless communication channel, or may be supplied to a processing system or application for processing further the information contained in the output images OImg.

For given dimensions of an optical unit, the imaging system 500 of FIG. 8 enhances image quality over a wide depth of field and avoids degradation of resolution, which usually is limited by the aperture-dependent blur. In addition, the imaging system 500 gains depth information DI which is nearly independent of the image content over the complete field of view.

The sharpness processing unit 350 is a functional block, e.g., a software program, an electronic circuit or a combination of a software program and an electronic circuit. The depth recovery and sharpness processing units 300, 350 may be integrated in different integrated circuits or in the same integrated circuit.

Figure 9:
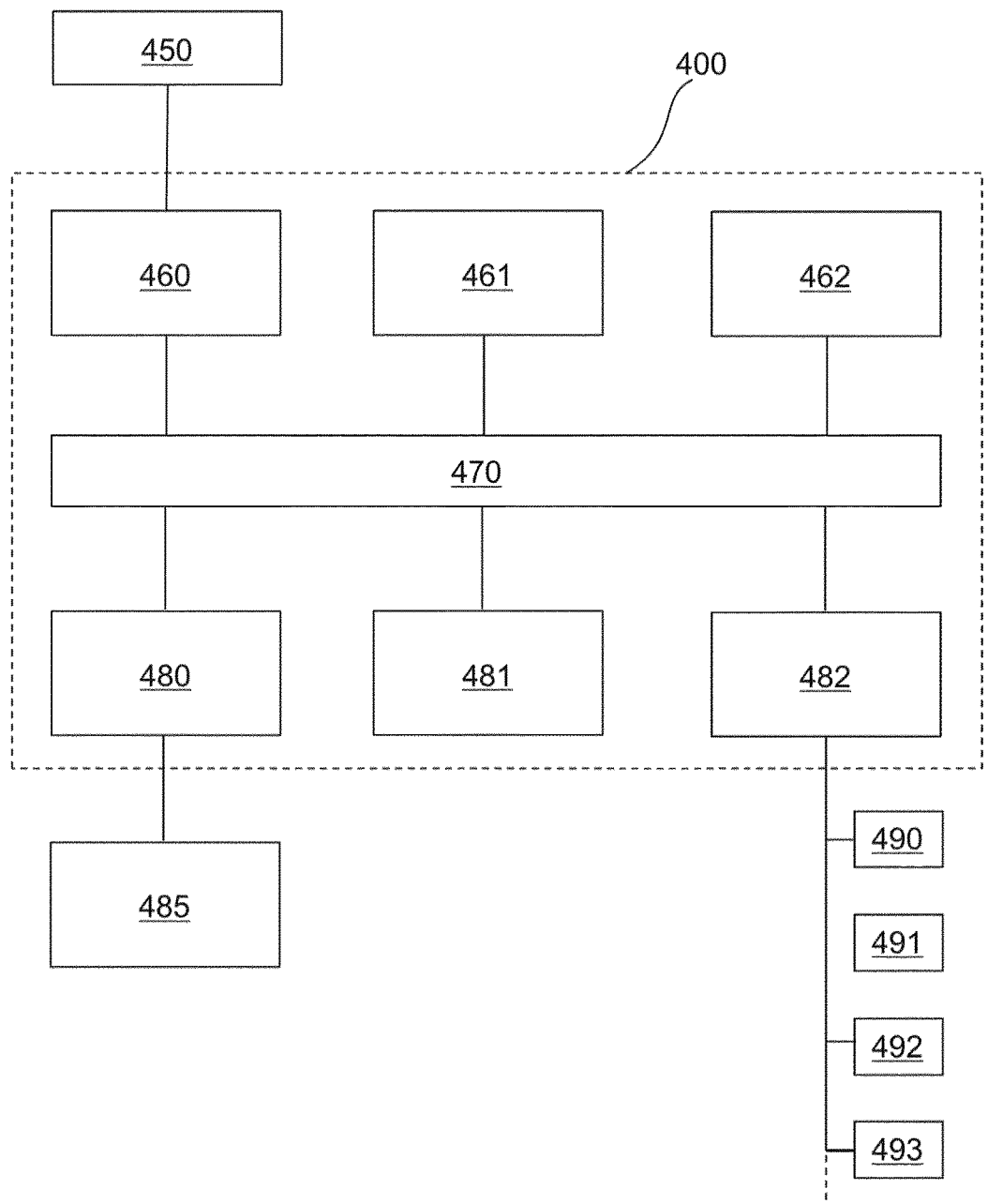
FIG. 9 is a schematic functional block diagram of a processor system according to a further embodiment.

FIG. 9 is a block diagram of a processing system 400 which may be part of an imaging system according to one of the embodiments described above. For example, the processing system 400 may retrieve depth information about a scene, from which images have been captured under illumination with structured light and under illumination with non-structured light, wherein the processing system 400 uses motion compensation for obtaining a reference image for background suppression in images obtained under illumination with structured light.

The processing system 400 includes a central processing unit 481 (CPU), which may be an application specific processor ASP or a microprocessor. The central processing unit 481 may execute software code that includes at least the pattern processing unit 200 or the depth recovery unit 300 or both as functional blocks or software routines. The central processing unit 481 may use a memory 461, e.g., ROM, EPROM, EEPROM, flash memory, static memory, DRAM, SDRAM for storing the program code and data to perform and/or control an imaging method executed in combination with an imaging system, for example an endoscope. A disk controller 462 may control a hard disk drive or optical disk drive. A central bus system 470 may connect components of the processing system 400 with each other and provides at least one path for digital communication between them.

A video controller 460 may image the output image or may use the retrieved depth information to render a 3D image that can be displayed on a monitor 450. The video controller 460 may include a graphic processing unit for improved computational efficiency. Additionally, an I/O (input/output) interface 482 may receive input data from a keyboard 490 or a pointing device 491 for controlling parameters of the various processes and algorithms of this disclosure or for controlling display characteristics. The monitor 450 may include a touch-sensitive interface to a command/instruction interface.

The components of the processing system 400 may be coupled to a network 485, such as the Internet or a local intranet, via a network interface 480 for transmission and/or reception of data, including controllable parameters. The network 485 may provide a communication path to a mobile device.

According to an embodiment the processing system 400 may receive first and second images from an optical unit as described above through the I/O interface 482. According to another embodiment, the processing system 400 may receive the first and second images from the optical unit through the network interface 480 or from one of the storage media.

Figure 10:
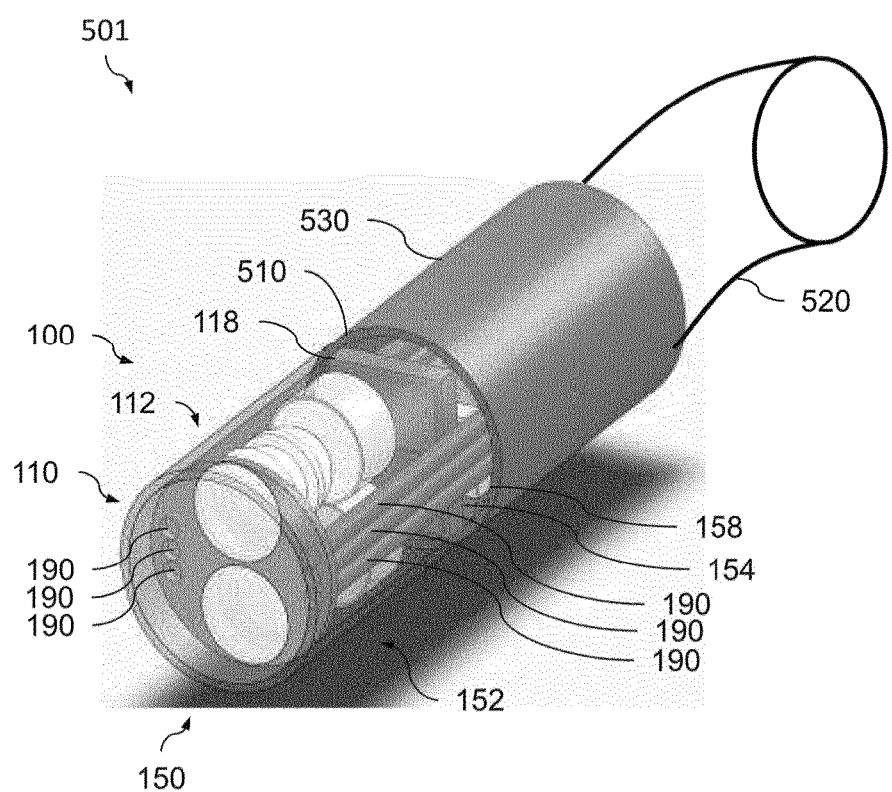
FIG. 10 is a schematic perspective view of an endoscope according to a further embodiment.

FIG. 10 shows a portion of a scanning equipment such as an endoscope 501 that may be used in industrial applications, for diagnostics or for minimally invasive surgery, by way of example. A cylindrical tip portion 510 is attached to an end face of a rigid or flexible tube portion 520 that may include optical fibres and electrical wirings. The tip portion 510 includes an optical unit 100 as described in detail in the forgoing. A housing 530 with a transparent front surface and an opaque cylinder surface may encapsulate the optical unit 100.

The optical unit 100 captures sets of first images of different wavelength ranges from a scene when the scene is completely illuminated. The optical unit 100 further captures sets of second images of different wavelength ranges from the scene when the scene is illuminated with structured light. An imaging unit 110 includes an imaging sensor unit 118 is arranged in a first half cylinder of the tip portion 510 and a projection unit 150 with an optical element 154 including an optic pattern for generating a shadow pattern in a second half cylinder.

A diameter of the tip portion 510 may be in a range from 3 mm to 5 mm. An aperture of the imaging unit 110 may be F/4 or smaller. The endoscope 501 may image scenes at a working range from 20 mm to 300 mm without sharpness degradation.

Figure 11:
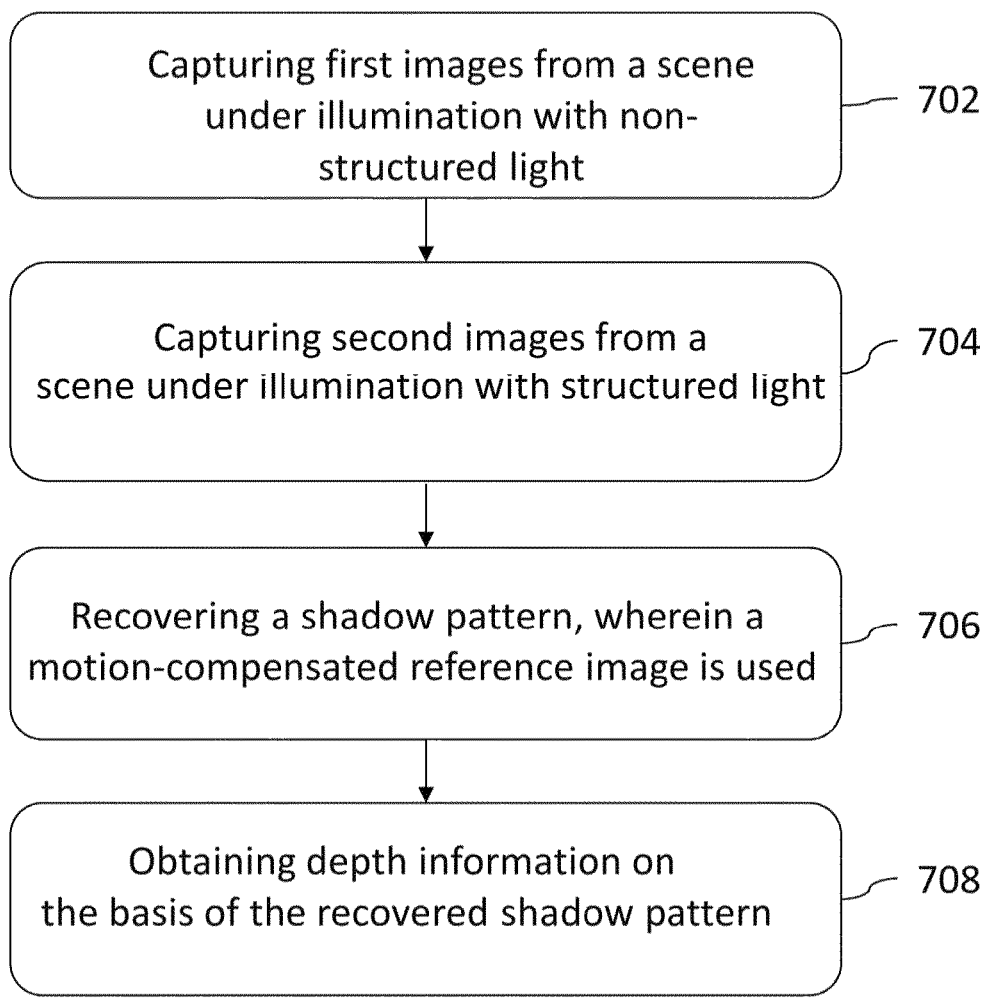
FIG. 11 is a simplified flowchart of an imaging method using an imagingsystem according to a further embodiment.

FIG. 11 illustrates an imaging method for an imaging system, for example an endoscope. From a scene, sets of first images, which may be of different wavelength ranges, are captured when the scene is illuminated with non-structured light (702) and sets of second images, which may be of the same different wavelength ranges, are captured when the scene is illuminated with structured light (704). From the second images, a shadow pattern is recovered that is projected onto the scene during illumination with structured light, wherein at least one motion-compensated reference image is used (706). Depth information is obtained from the second images on the basis of the recovered shadow pattern (708).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the disclosure, as well as other claims. The disclosure, including any readily discernible variants of the teachings herein, defines, in part, the scope of the foregoing claim terminology.

The present technology can also be configured as described below.

(1) An imaging system including:
  an optical unit configured to capture, from a scene, sets of first images and sets of second images, wherein the scene is illuminated with non-structured light when the sets of first images are captured and wherein the scene is illuminated with structured light when the sets of second images are captured;
  a pattern processing unit configured to generate, from the second images, a recovered shadow pattern from a shadow pattern projected onto the scene during illumination with structured light, wherein at least one motion-compensated reference image is used, respectively; and
  a depth processing unit configured to obtain depth information on the basis of the recovered shadow pattern.

(2) The imaging system according to (1), wherein
  the pattern processing unit includes a motion compensation unit configured to obtain the at least one motion-compensated reference image for a set of second images on the basis of successive sets of first images or on the basis of the set of second images and at least one previously or subsequently obtained set of first images.

(3) The imaging system according to (2), wherein
  the motion compensation unit is configured to obtain the reference images for a set of second images on the basis of the set of second images and a previous or subsequent set of first images.

(4) The imaging system according to (3), wherein
  the motion compensation unit is configured to use only not-shadowed sections of the second images outside of the shadow pattern.

(5) The imaging system according to (4), wherein
  the shadow pattern includes code lines including fields of different grey levels and non-shadowed white lines separating neighbouring code lines.

(6) The imaging system according to (2) to (5), wherein
  the motion compensation unit is configured to obtain the reference images for a set of second images on the basis of sets of first images captured before and after the set of second images.

(7) The imaging system according to (2) to (6), wherein
the motion compensation unit includes (i) a phase correlation unit configured to estimate a global motion vector and (ii) a recursive block matching unit configured to estimate local motion vectors on the basis of the global motion vector and the first images.

(8) The imaging system according to (7), wherein
the motion compensation unit includes an optical flow unit configured to estimate displacement vectors on the basis of auxiliary images partially motion-compensated by the local motion vectors.

(9) The imaging system according to (1), wherein
the optical unit includes an imaging lens unit with longitudinal chromatic aberration and an imaging sensor, wherein the imaging lens unit images the scene onto the imaging sensor.

(10) The imaging system according to (9), further including
a sharpness processing unit is configured to generate an output image based on the depth information and the first images.

(11) The imaging system according to (10), wherein
the sharpness processing unit is configured to exchange sharpness information among the first images of sets of first images.

(12) The imaging system according to (9) to (11), wherein
the optical unit is configured to capture the sets of first images in different wavelength ranges and the sets of second images in the different wavelength ranges, and the pattern processing unit includes a motion compensation unit configured to estimate the motion-compensated reference image for a set of second images on the basis of successive sets of first images and wherein the motion compensation unit includes (i) a phase correlation unit configured to estimate global motion vectors for each of the wavelength ranges and (ii) a recursive block matching unit configured to estimate local motion vectors on the basis of a combined global motion vector obtained from the global motion vectors for each of the wavelength ranges.

(13) The imaging system according to (1) to (12), wherein
the depth processing unit is configured to obtain the depth information from the recovered shadow pattern by using optical triangulation.

(14) The imaging system according to (1) to (13), wherein
the optical unit is configured to capture the sets of first images in different wavelength ranges and the sets of second images in the different wavelength ranges.

(15) The imaging system according to (14), wherein
one motion-compensated reference image derived from images assigned to the same wavelength range is used for recovering the shadow pattern in a set of second images.

(16) The imaging system according to (14) to (15), wherein
one motion-compensated reference image derived from images assigned to different wavelength range is used for recovering the shadow pattern in a set of second images.

(17) The imaging system according to (14) to (16), wherein
a plurality of motion-compensated reference images, each of them derived from images assigned to a same wavelength range, is used for recovering the shadow pattern in a set of second images.

(18) An imaging method including:
capturing, from a scene, sets of first images when the scene is illuminated with non-structured light and sets of second images when the scene is illuminated with structured light,
generating, from the second images, a recovered shadow pattern from a shadow pattern projected onto the scene during illumination with structured light, wherein at least one motion-compensated reference image is used, respectively; and
generating depth information on the basis of the recovered shadow pattern.

(19) The imaging method according to (18), wherein
the at least one motion-compensated reference image for a set of second images is obtained on the basis of successive sets of first images or on the basis of the set of second images and at least one previously or subsequently obtained set of first images.

(20) An imaging system including:
first means for capturing, from a scene, sets of first images and sets of second images, wherein the scene is illuminated with non-structured light when the sets of first images are captured and wherein the scene is illuminated with structured light when the sets of second images are captured;
second means for generating, from the second images, a recovered shadow pattern from a shadow pattern projected onto the scene during illumination with structured light, wherein at least one motion-compensated reference image is used, respectively, wherein the second means are coupled to the first means such that information is transmittable from the first means to the second means; and
third means for generating depth information on the basis of the recovered shadow pattern , wherein the third means are coupled to the second means such that information is transmittable from the second means to the third means.

The invention claimed is:
1. An imaging system comprising:
an imaging sensor configured to capture, from a scene, sets of first images and sets of second images, wherein the scene is illuminated with non-structured light when the sets of first images are captured and wherein the scene is illuminated with structured light when the sets of second images are captured;
pattern processing circuitry configured to generate, from the second images, a recovered shadow pattern from a shadow pattern projected onto the scene during illumination with structured light, wherein at least one motion-compensated reference image is used, respectively; and
depth processing circuitry configured to obtain depth information on the basis of the recovered shadow pattern,
wherein:
the pattern processing circuitry comprises motion compensation circuitry configured to obtain the at least one motion-compensated reference image for a set of second images on the basis of successive sets of first images or on the basis of the set of second images and at least one previously or subsequently obtained set of first images,
the motion compensation circuitry comprises (i) phase correlation circuitry configured to estimate a global motion vector and (ii) recursive block matching circuitry configured to estimate local motion vectors on the basis of the global motion vector and the first images, and
the motion compensation circuitry comprises optical flow circuitry configured to estimate displacement vectors on the basis of auxiliary images partially motion-compensated by the local motion vectors.

2. The imaging system according to claim 1, wherein the motion compensation circuitry is configured to obtain the reference images for a set of second images on the basis of the set of second images and a previous or subsequent set of first images.

3. The imaging system according to claim 2, wherein the motion compensation circuitry is configured to use only not-shadowed sections of the second images outside of the shadow pattern.

4. The imaging system according to claim 3, wherein the shadow pattern includes code lines including fields of different grey levels and non-shadowed white lines separating neighbouring code lines.

5. The imaging system according to claim 1, wherein the motion compensation circuitry is configured to obtain the reference images for a set of second images on the basis of sets of first images captured before and after the set of second images.

6. The imaging system according to claim 1, wherein the imaging sensor further comprises an imaging lens with longitudinal chromatic aberration, wherein the imaging lens images the scene onto the imaging sensor.

7. The imaging system according to claim 6, further comprising
sharpness processing circuitry is configured to generate an output image based on the depth information and the first images.

8. The imaging system according to claim 7, wherein the sharpness processing circuitry is configured to exchange sharpness information among the first images of sets of first images.

9. An imaging system comprising:
an imaging sensor configured to capture, from a scene sets of first images and sets of second images, wherein the scene is illuminated with non-structured light when the sets of first images are captured and wherein the scene is illuminated with structured light when the sets of second images are captured;
pattern processing circuitry configured to generate% from the second images, a recovered shadow pattern from a shadow pattern projected onto the scene during illumination with structured light, wherein at least one motion-compensated reference image is used, respectively; and
depth processing circuitry configured to obtain depth information on the basis of the recovered shadow pattern,
wherein:
the imaging sensor further comprises an imaging lens with longitudinal chromatic aberration, wherein the imaging lens images the scene onto the imaging sensor, and
the imaging sensor is configured to capture the sets of first images in different wavelength ranges and the sets of second images in the different wavelength ranges, and the pattern processing circuitry comprises a motion compensation circuitry configured to estimate the motion-compensated reference image for a set of second images on the basis of successive sets of first images and wherein the motion compensation circuitry comprises (i) a phase correlation circuitry configured to estimate global motion vectors for each of the wavelength ranges and (ii) a recursive block matching circuitry configured to estimate local motion vectors on the basis of a combined global motion vector obtained from the global motion vectors for each of the wavelength ranges.

10. The imaging system according to claim 1, wherein the depth processing circuitry is configured to obtain the depth information from the recovered shadow pattern by using optical triangulation.

11. The imaging system according to claim 1, wherein the imaging sensor is configured to capture the sets of first images in different wavelength ranges and the sets of second images in the different wavelength ranges.

12. The imaging system according to claim 11, wherein one motion-compensated reference image derived from images assigned to the same wavelength range is used for recovering the shadow pattern in a set of second images.

13. The imaging system according to claim 11, wherein one motion-compensated reference image derived from images assigned to different wavelength range is used for recovering the shadow pattern in a set of second images.

14. The imaging system according to claim 11, wherein a plurality of motion-compensated reference images, each of them derived from images assigned to a same wavelength range, is used for recovering the shadow pattern in a set of second images.

15. An imaging method comprising:
capturing, from a scene, sets of first images when the scene is illuminated with non-structured light and sets of second images when the scene is illuminated with structured light,
generating, from the second images, a recovered shadow pattern from a shadow pattern projected onto the scene during illumination with structured light, wherein at least one motion-compensated reference image is used, respectively; and
generating depth information on the basis of the recovered shadow pattern,
wherein:
the generating the recovered shadow pattern includes obtaining the at least one motion-compensated reference image for a set of second images on the basis of successive sets of first images or on the basis of the set of second images and at least one previously or subsequently obtained set of first images,
the obtaining comprises (i) phase correlation circuitry configured to estimate a global motion vector and (ii) recursive block matching circuitry configured to estimate local motion vectors on the basis of the global motion vector and the first images, and
the obtaining comprises optical flow circuitry configured to estimate displacement vectors on the basis of auxiliary images partially motion-compensated by the local motion vectors.

16. The imaging method according to claim 15, wherein the at least one motion-compensated reference image for a set of second images is obtained on the basis of successive sets of first images or on the basis of the set of second images and at least one previously or subsequently obtained set of first images.

* * * * *